United States Patent
Osman et al.

(10) Patent No.: US 10,776,092 B2
(45) Date of Patent: Sep. 15, 2020

(54) METHOD OF OBTAINING A PROGRAM TO BE EXECUTED BY A ELECTRONIC DEVICE, SUCH AS A SMART CARD, COMPRISING A NON-VOLATILE MEMORY

(71) Applicant: IDEMIA IDENTITY & SECURITY FRANCE, Courbevoie (FR)

(72) Inventors: Fadi Osman, Courbevoie (FR); Marc Brugnon, Courbevoie (FR); Houssem Maghrebi, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 16/200,457

(22) Filed: Nov. 26, 2018

(65) Prior Publication Data
US 2019/0163454 A1    May 30, 2019

(30) Foreign Application Priority Data
Nov. 27, 2017    (FR) .................................... 17 61223

(51) Int. Cl.
*G06F 8/41* (2018.01)
*G06F 3/06* (2006.01)
(Continued)

(52) U.S. Cl.
CPC .............. *G06F 8/447* (2013.01); *G06F 3/061* (2013.01); *G06F 3/0616* (2013.01);
(Continued)

(58) Field of Classification Search
None
See application file for complete search history.

(56) References Cited

U.S. PATENT DOCUMENTS

| 6,446,254 B1 | 9/2002 | Chapman et al. |
| 8,495,281 B2 * | 7/2013 | Iliadis ................. G06F 12/0246 711/103 |

(Continued)

FOREIGN PATENT DOCUMENTS

EP    2472405 A1    7/2012

OTHER PUBLICATIONS

PWL: A progressive wear leveling to minimize data migration overheads for NAND flash devices, Chen et al., Design, 2015 Automation & Test in Europe Conference & Exhibition, Aug. 15, 2015 (Year: 2015).*

(Continued)

*Primary Examiner* — Daxin Wu
(74) *Attorney, Agent, or Firm* — Womble Bond Dickinson (US) LLP

(57) ABSTRACT

The invention relates to a method for obtaining a program intended to be executed by an electronic device (1), such as a smart card, comprising a non-volatile memory, the process comprising the insertion (E12, E14), in a source code, of a first function at the start of a source code instruction block, and a second function at the end of the source code instruction block, then generation (E16) of the executable program from the source code, wherein the first function is configured to disable a wear-reduction mechanism of the non-volatile memory, when the program is executed by the electronic device, and the second function is configured to enable the wear-reduction mechanism of the non-volatile memory, when the program is executed by the electronic device.

11 Claims, 3 Drawing Sheets

(51) Int. Cl.
*G06F 12/02* (2006.01)
*G06F 8/70* (2018.01)

(52) U.S. Cl.
CPC .......... *G06F 3/0634* (2013.01); *G06F 3/0647* (2013.01); *G06F 3/0679* (2013.01); *G06F 12/0246* (2013.01); *G06F 8/70* (2013.01); *G06F 2212/7203* (2013.01); *G06F 2212/7206* (2013.01); *G06F 2212/7211* (2013.01)

(56) References Cited

U.S. PATENT DOCUMENTS

| | | | |
|---|---|---|---|
| 2009/0100215 A1* | 4/2009 | Nochimowski | G06F 12/0246 711/103 |
| 2009/0113112 A1 | 4/2009 | Ye et al. | |
| 2009/0172253 A1* | 7/2009 | Rothman | G06F 12/0246 711/103 |
| 2010/0281204 A1 | 11/2010 | Yano et al. | |
| 2011/0271046 A1* | 11/2011 | Iyer | G06F 12/0246 711/103 |
| 2014/0040535 A1* | 2/2014 | Lee | G06F 12/0246 711/103 |
| 2015/0301936 A1* | 10/2015 | Matsui | G06F 3/0652 711/103 |
| 2016/0210044 A1* | 7/2016 | Mitkar | G06F 3/0655 |
| 2017/0075620 A1* | 3/2017 | Yamamoto | G06F 3/0608 |
| 2017/0293449 A1* | 10/2017 | Sunwoo | G06F 3/0619 |
| 2018/0088810 A1* | 3/2018 | Ramalingam | G06F 12/0246 |
| 2018/0262567 A1* | 9/2018 | Klein | G06F 3/061 |
| 2018/0349287 A1* | 12/2018 | Kan | G06F 12/1009 |
| 2019/0056883 A1* | 2/2019 | Kim | G06F 12/126 |
| 2019/0066752 A1* | 2/2019 | Fackenthal | G11C 11/2253 |

OTHER PUBLICATIONS

Preliminary Research Report and Written Opinion received for French Application No. 1761223, dated Jul. 17, 2018, 10 pages (1 page of French Translation Cover Sheet and 9 pages of original document).

Lee et al., "Mitigating write interference on SSD in home cloud server", 2018 IEEE International Conference on Consumer Electronics (ICCE), 2018, 3 pages.

Hu et al., "Software enabled wear-leveling for hybrid PCM main memory on embedded systems", 2013 Design, Automation & Test in Europe Conference & Exhibition (Date), 2013, 4 pages.

Febiansyah et al., "Hybrid RAM system's development APIs", 2013 International Conference on Advanced Computer Science and Information Systems (ICACSIS), 2013, pp. 101-106.

European Search Report and Written Opinion received for EP Patent Application No. 18306569.7, dated Feb. 15, 2019, 9 pages of Original Document Only.

* cited by examiner

METHOD OF OBTAINING A PROGRAM TO BE EXECUTED BY A ELECTRONIC DEVICE, SUCH AS A SMART CARD, COMPRISING A NON-VOLATILE MEMORY

GENERAL TECHNICAL FIELD

The present invention relates to a writing process in a non-volatile flash memory.

PRIOR ART

An electronic device such as a card SIM, eSIM (Embedded SIM or eUICC), or an embedded secure element conventionally uses a non-volatile "flash" memory in which both applications and data useful to these applications especially are stored.

Memories of "flash" type are partitioned into several pages (or sectors), each page comprising a predefined number of bytes. The page is the base writing unit in the flash memory (this means that the bytes of a page must be modified simultaneously—a single byte of a page cannot be updated without affecting the other bytes of this page, except if this byte is "empty". Therefore normally, the page has to be deleted, then all its data need to be rewritten. On the contrary, it is possible to modify the "empty" bytes without affecting the other bytes of the page.

During its use, a non-volatile memory is subjected to many deletion and writing cycles, which creates wear on the flash memory. Typically, a page memory can support up to 100,000 deletion/writing cycles.

So-called techniques for distribution of wear or wear levelling have been developed to limit premature wear of flash memory. These techniques aim to prolong the shelf life of the flash memory and are usually implemented in the region of the controller of the flash memory.

One problem is that for cost reasons some secure elements do not incorporate a wear levelling mechanism and therefore do not manage wear.

Another problem is that these mechanisms can slow the operation of the element.

The prior art also discloses a process during which a wear-reduction mechanism of a non-volatile memory is used or not, according to the data to be written in this non-volatile memory. The decision to use or not use this wear-reduction mechanism is made by a material controller.

Such a process however has the disadvantage of not being able to finely control deactivation of the wear mechanism. Finally, a material controller can make the decision to use or not use a wear mechanism only as a function of the datum itself concerned by access, which constitutes limited information. The deactivation policy followed by such a controller is therefore very rigid. Such a controller generally does not know the context in which this datum is handled. With such a process, it is therefore not possible to find an ideal compromise between wear reduction and savings in material resources.

PRESENTATION OF THE INVENTION

An aim of the invention is to be able to adjust, within a device comprising a non-volatile memory, a compromise between wear reduction of this memory and performance of the device.

For this purpose, according to a first aspect of the invention a method is proposed for obtaining a program intended to be executed by an electronic device, such as a smart card, comprising a non-volatile memory, the process comprising steps of insertion, in a source code, of a first function at the start of a source code instruction block, and insertion of a second function at the end of the source code instruction block, after the insertions, generation of the executable program from the source code, wherein the first function is configured to disable a wear-reduction mechanism of the non-volatile memory, when the program is executed by the electronic device, the second function is configured to enable the wear-reduction mechanism of the non-volatile memory, when the program is executed by the electronic device.

In the end, it is during the development of the program when a compromise is found between the wear of the non-volatile memory and the performances of the program. This allows much more flexible management of the non-volatile memory than systems determining at the hardware level and dynamically whether a datum must be accessed in volatile memory by passing via the wear-reduction mechanism or not. Finally, the hardware making such a decision generally does not know the context wherein this datum must be accessed. By way of the method according to the first aspect of the invention, it is proposed to determine from the design stage of the program those sections of code which will benefit from the wear-reduction mechanism, and the sections of code where it is acceptable to allow temporary deactivation of this mechanism to save on material resources. This is how it is possible to find an ideal compromise between wear reduction and savings in material resources.

The method according to the first aspect of the invention can also comprise the following characteristics, taken singly or in combination whenever technically possible.

Preferably, the program comprises a target code instruction block generated from the source code instruction block, and the source code instruction block is determined as a function of a potential execution frequency of the target code instruction block, during the execution of the program by the electronic device.

Preferably, the program comprises a target code instruction block generated from the source code instruction block, and the source code instruction block is determined as a function of a number of reading access instances in the non-volatile memory, during the execution of the target code instruction block by the electronic device.

Preferably, the program comprises a target code instruction block generated from the source code instruction block, the wear-reduction mechanism uses a buffer memory to access data in the non-volatile memory, and the source code instruction block is determined such that an execution of the target code instruction block by the electronic device does not cause handling of data present in the buffer memory.

Preferably, the program comprises a target code instruction block generated from the source code instruction block, and the source code instruction block is determined as a function of a number of data likely to be written in the non-volatile memory during the execution of the target code instruction block by the electronic device.

Preferably, the number of data is greater than or equal to the size of the buffer memory.

Preferably, the wear-reduction mechanism uses a buffer memory to access data in the non-volatile memory, and the deactivation of the mechanism by the first function or the reactivation of the mechanism by the second function comprises emptying of the buffer memory.

According to a second aspect of the invention, a computer program product is proposed likely to be obtained by the method according to the first aspect of the invention.

According to a third aspect of the invention, an electronic device is also proposed, such as a smart card, comprising a non-volatile memory, a wear-reduction mechanism of the non-volatile memory, and at least one processor configured to execute the computer program product according to the preceding claim.

PRESENTATION OF FIGURES

Other characteristics, aims and advantages of the invention will emerge from the following description which is purely illustrative and non-limiting and which must be considered with respect to the appended drawings, in which:

FIG. 1 schematically illustrates a secure element such as a smart card;

Similar elements bear identical reference numerals in all figures.

DETAILED DESCRIPTION OF THE INVENTION

Figure 1:
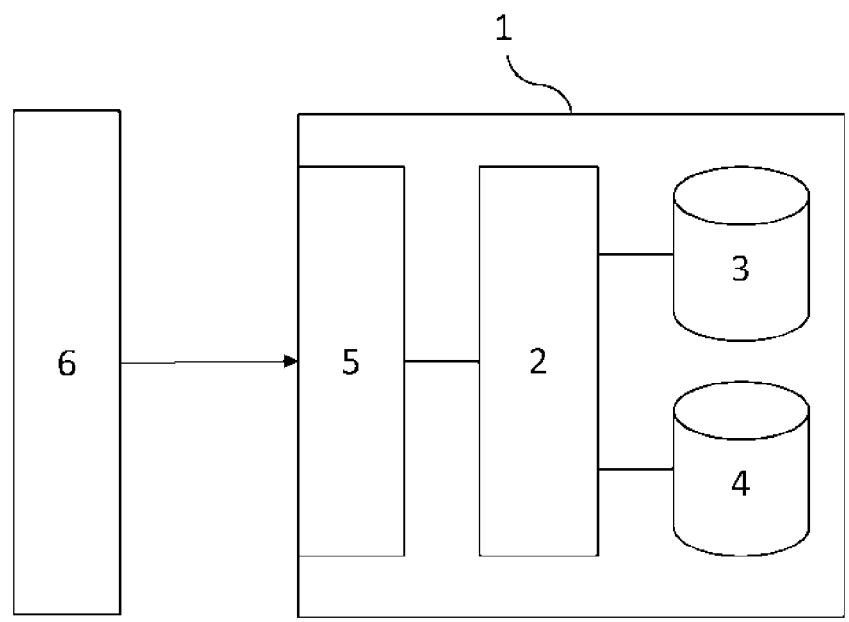

In reference to FIG. 1, an electronic device 1 comprises at least one processor 2, at least one non-volatile memory 3 and at least one volatile memory 4.

The non-volatile memory 3 persistently stores programs and data intended to be handled by the programs. This memory 3 is for example of flash type.

The non-volatile memory 3 can be internal or external.

The non-volatile memory 3 comprises a plurality of physical sectors. Each physical sector has a physical address and can host data.

The non-volatile memory 3 especially stores several programs: an operating system, at least one application likely to be executed by the operating system.

The processor 2 is configured to execute one or the other of these programs.

The non-volatile memory 3 is also intended to store data handled by these programs. These data are either present in the memory 3 prior to initial commissioning of the electronic device or written in the memory 3 by one or the other of these programs after such commissioning.

In particular, the operating system occupies a plurality of physical sectors of the non-volatile memory 3.

Also, the purpose of the volatile memory 4 is to temporarily store data until the electronic device 1 is powered down. The memory 4 is for example of RAM type (Random Access Memory).

The electronic device 1 also comprises a communication interface 5 with another device 6.

The communication interface 5 comprises for example at least one contact electrical intended to be put in electrical contact with a contact of the other device 6, such that electrical signals carrying data can be communicated between the two devices. By way of variant or in addition, the communication interface comprises a radio antenna, for example to set up a Near Field Communication (NFC).

The electronic device 1 is for example an Embedded or Integrated Secure Element (for example in UICC format).

A method executed by a program stored in the non-volatile memory during its execution comprises the following steps.

In a first instance, a program stored in the non-volatile memory 3 is executed.

During the execution of this program, access is made to the non-volatile memory according to a first access mode or a second access mode.

According to the first access mode a wear-reduction mechanism of the non-volatile memory is used, whereas according to the second access mode this wear-reduction mechanism of the non-volatile memory is not used.

Such a wear-reduction mechanism is of wear levelling or write buffer type. As far as wear levelling is concerned, reference could be made to the document Mittal/Vetter, A Survey of Software Techniques for Using Non-Volatile Memories for Storage and Main Memory Systems, IEEE, 2015.

Such mechanisms limit wear of the non-volatile memory but are consumers of resources. In this respect, a mechanism for managing memory performs one or more specific functions using specific resources of the secure element which are consumers of non-volatile memory and duration and have a considerable impact on the performance of the program.

The wear-reduction mechanism of the non-volatile memory can be temporarily disabled during the execution of the program by the processor 2.

As will be evident hereinbelow, disabling the wear-reduction mechanism of the non-volatile memory depends solely on the place where the execution pointer of the processor 2 in the program is located. In particular, executing the first mode or the second and therefore the stopping or pausing of the mechanism managing memory is done during execution of the program.

The choice of stopping or pausing the mechanism managing memory is a question of compromise: with stopping needing more resources than pausing it is as a function of the objective undertaken by the program that the choice is made, this choice being left to the developer of the program. Therefore, it is manually that the choice is made in contrast to conventional executions according to which the memory management mechanisms are executed automatically independently of optimisation of resources used by the program.

According to the second access mode, the data are handled without using any wear-reduction mechanism of the non-volatile memory.

In particular, modifications (creation of an object or updating of an object) to the content of the non-volatile memory are made in the volatile memory 4. Also, when a modification must be made, the content of the non-volatile memory is fully copied in the volatile memory, and modifications are made to this copy in the volatile memory.

Once modifications are made in volatile memory, the non-volatile memory is deleted and the content coming from the volatile memory is copied in the non-volatile memory.

It is this modification mechanism which "wears" the non-volatile memory and this is why the wear-reduction mechanism of the non-volatile memory is implemented during the first access mode.

Also, still according to this second access mode, writing in the content of the non-volatile memory is done directly in the non-volatile memory.

Figure 3:
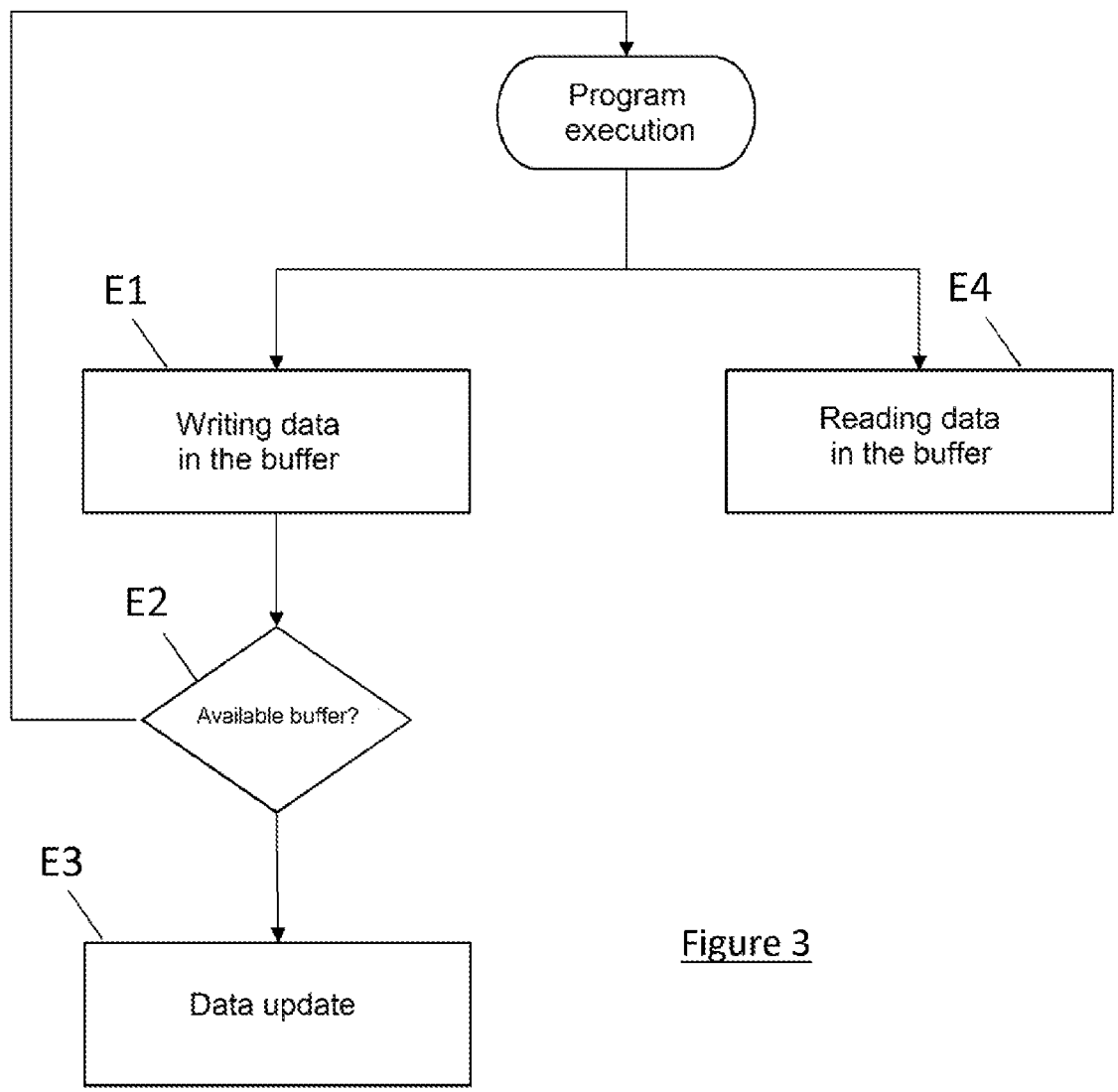
FIGS. 3 and 4 illustrate steps of methods according to the invention.

According to an advantageous embodiment, the first access mode comprises implementing a wear reduction mechanism with write buffer described in relation to FIG. 3.

Figure 2:
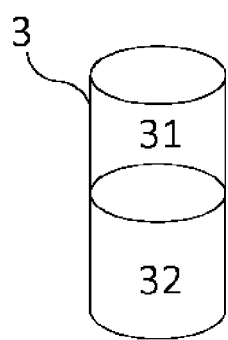
FIG. 2 illustrates partitions of volatile memory executed in the invention.

On a preliminary basis, it is considered that a first portion 31 of the non-volatile memory 3 is reserved for execution of the program as well as for storage of the code of the programmer and data (persistent between two restarts), while a second portion 32 of the non-volatile memory 3 is allocated to a write buffer (see FIG. 2). In particular, a small portion of the volatile memory is reserved for the write buffer. The rest is used for storing both the code and the data.

Referring back to FIG. 3, during the execution of the program, when data must be written (created or updated) the latter are written (step E1) following each other in the write buffer. Filling (step E2) of the buffer is verified after each writing in the buffer so that it can contain fresh data.

Preferably, the data are written in the buffer in a region of "empty" bytes, which avoids going through deletion/writing cycles, and therefore causes no wear.

When the buffer is full or else when it is detected that its capacity is no longer enough to contain fresh data (step E3) updating of data is performed in the first portion 31 of the non-volatile memory 3 (the portion allocated to execution of the program).

This updating (step E3) is executed page by page and comprises the following steps.

The content of the page to be updated is copied from the first portion 31 of the non-volatile memory 3 into the content of the volatile memory 4.

The write buffer 32 is scanned to recover data in their most recent version (modification or creation). These modifications are consolidated into the content copied to volatile memory.

Next, the content of the volatile memory is copied in the page of the first portion of the non-volatile memory (after deletion of the latter).

Advantageously, the buffer is reset to zero and its content is deleted.

Accordingly, as will be understood, the deletion/writing procedure in the non-volatile memory is done only in cases where the buffer is full or else at the limit of its capacity.

In addition, when data must be read (step E4), while the write buffer mechanism is active, data must be consolidated between those which have just been modified and/or created in the write buffer 32 with those present in the non-volatile memory 31. For this to happen, here too the buffer is scanned to verify whether the datum read is in the write buffer or in the first portion of the non-volatile memory only.

This causes notable effects on performances, especially in the event of frequent access.

By contrast, when the write buffer mechanism is disabled, the data reading procedure with consolidation described hereinabove is not executed. The data are read directly from the non-volatile memory 31, preventing degradation of performance.

Disabling the wear-reduction mechanism can be stopping or pausing of this mechanism.

When the wear-reduction mechanism uses a buffer (such as the write buffer 32), stopping consists of completely emptying the write buffer 32 by updating all pages modified in the non-volatile memory 31. Therefore, frequent stops of the write buffer mechanism affect performance by provoking instances of writing, and cause wear of the non-volatile memory.

By contrast, pausing of the write buffer mechanism only disables the data reading procedure with consolidation. Therefore, the content of the write buffer is retained and the negative effects on performance are avoided.

According to a second embodiment advantageous, the wear-reduction mechanism of the non-volatile memory executes a counter. In case of stopping of the memory management mechanism the counter is reset to zero, whereas in the event of pausing the counter is simply interrupted. Here too, pausing has less effect on performance than stopping.

As indicated previously, the active or non-active character of the wear-reduction mechanism depends solely on the part of the program being executed, that is, of the localisation of the execution pointer of the processor 2 during execution of the program by this processor 2. It is the programmer of the program who determines in advance, during coding of the program, which instructions code of the program must benefit from the wear-reduction mechanism or not.

Figure 4:
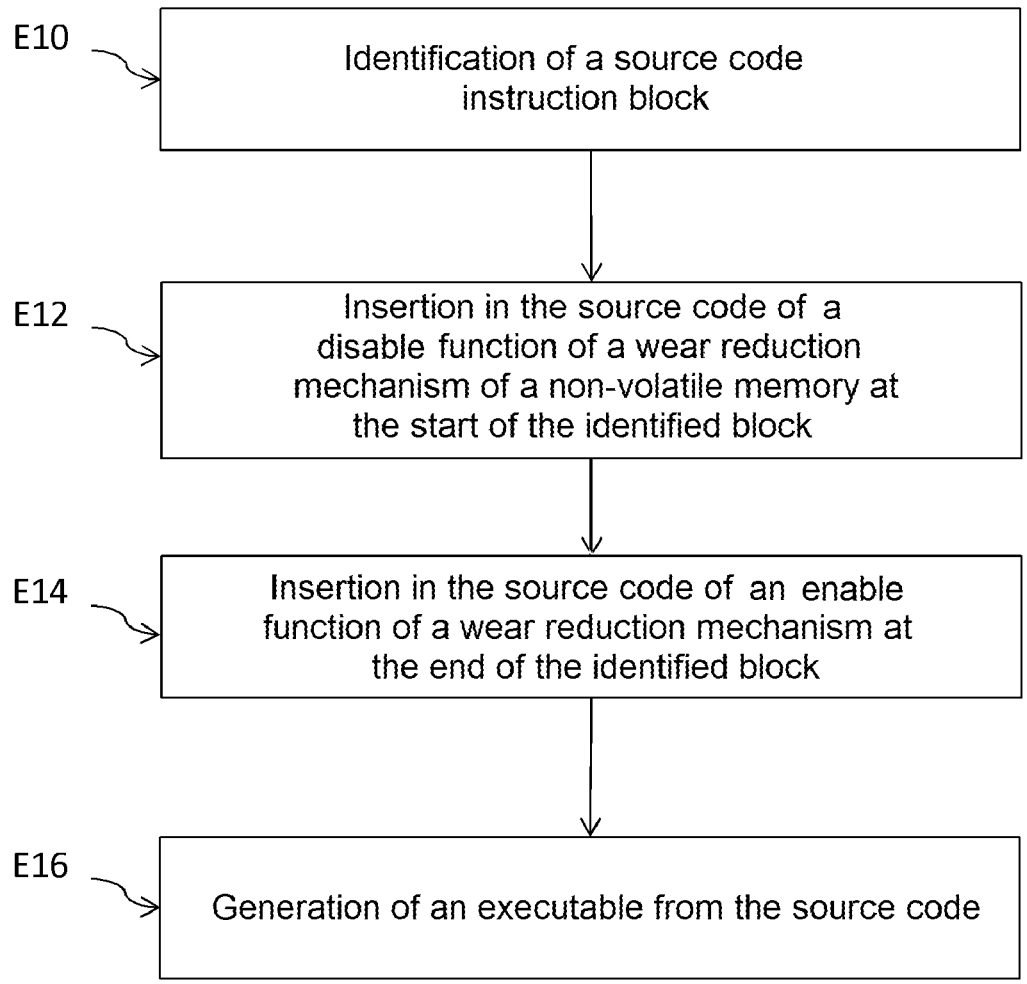

In reference to FIG. 4, the program executed by the electronic device 1 is obtained by a process comprising the following steps, on the basis of source code.

The source code comprises a plurality of source code instructions written in a predetermined programming language.

A programmer identifies in the source code a source code instruction block comprising one or more instructions (step E10). The source code instruction block starts with an initial instruction and terminates with a final instruction.

The programmer identifies the source code instruction block during step E10 by using certain specific criteria which will be discussed later.

The programmer inserts in the source code a deactivation function at the start of the source code instruction block (step E12). In other words, the programmer ensures that the deactivation function can be executed just before the initial instruction of the block.

The deactivation function is configured to disable the wear-reduction mechanism of the non-volatile memory described previously. This deactivation is either pausing or stopping as per the preceding description.

Typically, at the start of the identified source code instruction block the programmer inserts a call to the deactivation function. In this case, the deactivation function forms part of the source code, or else forms part of a library, for example precompiled. This allows for factoring in of the source code and simply reutilising the deactivation function at several places in the source code. As a variant, the instructions of the deactivation function are directly written just before the block.

The programmer also inserts in the source code a reactivation function at the end of the source code instruction block (step E14). In other words, the programmer ensures that the reactivation function can be executed just after the final code instruction of the block.

Also, the reactivation function is configured to (re)enable the wear-reduction mechanism of the non-volatile memory.

Typically, at the end of the source code instruction block the programmer inserts a call to the reactivation function. In this case, the deactivation function forms part of the source code, or else forms part of a library, for example precompiled. This allows for factoring in of the source code and simply reutilising the reactivation function at several places in the source code. As a variant, the instructions of the reactivation function are directly written just before the block.

Insertions of the deactivation and reactivation steps functions E12 and E14) can of course be executed in any order.

Once these insertions are completed, the source code can then have the following form:

```
...
Disable_WL( ); // call to the deactivation function
// start of a source code instruction block
...
// end of the source code instruction block
Enable_WL( ); // call to the reactivation function
...
```

The identification E10 and insertion E12, 14 steps are repeated for example for several different source codes instructions blocks of the source code.

The programmer has the possibility of making a choice between the two deactivation modes of the wear-reduction mechanism described previously (stop or pause).

For example, a generic function Disable_WL( ) can take as parameter a value for selecting one of the two deactivation modes of the wear-reduction mechanism of non-volatile memory.

As a variant, the programmer has at its disposition not two generic functions but four functions. For pausing, the programmer can enclose a block by a pause function Pause_WL( ) and a resume function Resume_WL( ). For a stop, the programmer can enclose such a block by a stop function Stop_WL( ) and a restart function Start_WL( ).

Once the writing of the source code is complete, the program intended to be executed by the electronic device 1 is generated from the source code enriched with the deactivation/reactivation functions (step E16).

The generation step E16 can for example comprise a compilation of the source code. Such compilation converts source code instructions into target code instructions, interpretable by the processor 2 of the electronic device 1.

In this way, during the generation E16 of the executable program,
- a call to the deactivation function in the source code is converted into a first target code instruction block,
- a call to the reactivation function in the source code is converted into a second target code instruction block,
- the source code instruction block enclosed by these two calls is itself converted into a third target code instruction block.

During the execution of the program by the processor 2, the following will be executed in this order: the first, then the third then the second target code instruction block. When the point of execution of the processor 2 achieves a call to the deactivation function, this is executed by the processor 2, therefore the wear-reduction mechanism described previously is disabled. The block located between a call to the deactivation function and a subsequent call to the reactivation function are then executed by the processor 2 without the wear-reduction mechanism being used. Admittedly, this non-use of this mechanism is more wear on the non-volatile memory. Yet it lightens consumption of resources by the program. Subsequently, the point of execution of the processor 2 achieves a call to the reactivation function, which is therefore executed by the processor 2. The wear-reduction mechanism described previously is then enabled.

In the end, it is during the development of the program when a compromise is found between wear of the non-volatile memory and the performance of the program. This allows far more flexible management of the non-volatile memory than systems determining at the material level and dynamically whether a datum must be accessed in volatile memory in passing through the wear-reduction mechanism or not. Finally, the hardware making such a decision generally does not know the context in which this datum must be accessed. The invention proposes determining from the design stage of the program those sections of code which will benefit from the wear-reduction mechanism, and those sections of code where it is acceptable to indulge in temporarily deactivating this mechanism to save on material resources. This is how it is possible to find an ideal compromise between wear reduction and saving on material resources.

It has been seen previously that the programmer has the choice to disable the wear-reduction mechanism by stopping or by pausing this mechanism.

The pause function has the advantage of being fast to execute since it causes no flushing of a buffer. In return, it obliges the programmer to ensure that the block which located between a call to the pause function of the wear-reduction mechanism of the non-volatile memory and a subsequent call to the resume function of this mechanism does not handle data present in the buffer. The programmer will therefore place these two functions about an instruction block adapted to respect this base condition. If this base condition is not verified, execution of the program can be unstable.

Another identification criterion of a source code instruction block which the programmer can utilise is the potential execution frequency of the corresponding target code instruction block after compilation, by the electronic device.

For example, when an instruction block in question is executed frequently, it can be advantageous to enclose it via the pause and resume functions, so as to boost savings on material resources caused by temporary pausing of the wear-reduction mechanism.

To determine such potential frequency of access prior to execution of the program by the processor 2, the programmer can utilise profiling tools known to the skilled person.

Yet another identification criterion of utilisable source code instruction block is the number of read operations which will occur in the non-volatile memory, during the execution of the target code instruction block corresponding to the source code instruction block by the electronic device.

Also, the stop function has the advantage for the programmer of being insertable anywhere in the source code. As the deactivation function flushes the buffer, there is no need at all to ensure that the instruction block which follows call to the stop function ceases to modify the content of this buffer. In other words, the programmer can enclose without constraint any source code instruction block via the stop and restart functions, without later risk of instability. In return, execution of the stop function takes more time than execution of the pause function, since the buffer must be emptied.

Although the programmer is free to choose the source code instruction block to be enclosed by the stop and restart functions, it is preferable to consider the number of data likely to be written in the non-volatile memory during the execution of the corresponding target code instruction block by the electronic device.

Using the stop and restart functions is particularly advantageous to enclose a block which finally writes such a number of data greater than or equal to the size of the buffer. Finally, in such a case where the buffer is saturated, the wear-reduction mechanism using this buffer becomes less effective; the consumption of additional material resources caused by use of this mechanism becomes a minimally profitable investment. This mechanism might be disabled temporarily to also gain in material resources.

The invention claimed is:

1. A method of obtaining a program which is executable by an electronic device comprising a non-volatile memory, wherein the method comprises:
   inserting, in a source code, a first function at the start of a source code instruction block, and a second function at the end of the source code instruction block, then
   generating the executable program from the source code, wherein
   executing the first function disables a wear-levelling mechanism of the non-volatile memory independent of runtime events,
   executing the second function enables the wear-levelling mechanism of the non-volatile memory independent of runtime events.

2. The method according to claim 1, wherein the program comprises a target code instruction block generated from the source code instruction block, and wherein the source code instruction block is determined as a function of a potential execution frequency of the target code instruction block by the electronic device.

3. The method according to claim 1, wherein the program comprises a target code instruction block generated from the source code instruction block, and wherein the source code instruction block is determined as a function of a number of read accesses in the non-volatile memory during the execution of the target code instruction block by the electronic device.

4. The method according to claim 1, wherein the program comprises a target code instruction block generated from the source code instruction block, wherein the wear-levelling mechanism uses a buffer to access data in the non-volatile memory, and wherein the source code instruction block is determined such that an execution of the target code instruction block by the electronic device does not cause handling of data present in the buffer.

5. The method according to claim 1, wherein the program comprises a target code instruction block generated from the source code instruction block, and wherein the source code instruction block is determined as a function of an amount of data to be written into the non-volatile memory during the execution of the target code instruction block by the electronic device.

6. The method according to claim 5, wherein the amount of data is greater than or equal to a size of the buffer.

7. The method according to claim 5, wherein the wear-levelling mechanism uses a buffer to access data in the non-volatile memory, and wherein disabling the mechanism by the first function or enabling the mechanism by the second function comprises flushing the buffer.

8. The method according to claim 1, wherein the electronic device is a smartcard.

9. A non-transitory computer program product obtained by a method comprising:
   inserting, in a source code, a first function at the start of a source code instruction block, and a second function at the end of the source code instruction block, then
   generating the executable program from the source code,
   storing the generated executable program on said non-transitory computer program product, wherein
   during runtime of the executable program, executing the first function disables a wear-levelling mechanism of a non-volatile memory, independent of runtime events, and
   during runtime of the executable program, executing the second function enables the wear-levelling mechanism of the non-volatile memory, independent of runtime events.

10. An electronic device comprising a non-volatile memory, a wear-levelling mechanism of the non-volatile memory, and at least one processor configured to execute the computer program product according to claim 9.

11. An electronic device according to claim 10, wherein the electronic device is a smartcard.

* * * * *